(12) United States Patent
Kobayashi et al.

(10) Patent No.: US 10,518,589 B2
(45) Date of Patent: Dec. 31, 2019

(54) PNEUMATIC TIRE

(71) Applicant: BRIDGESTONE CORPORATION, Tokyo (JP)

(72) Inventors: Fumitaka Kobayashi, Tokyo (JP); Hiroaki Fujiwara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 197 days.

(21) Appl. No.: 15/318,307

(22) PCT Filed: May 25, 2015

(86) PCT No.: PCT/JP2015/002630
§ 371 (c)(1),
(2) Date: Dec. 12, 2016

(87) PCT Pub. No.: WO2015/190049
PCT Pub. Date: Dec. 17, 2015

(65) Prior Publication Data
US 2017/0113492 A1   Apr. 27, 2017

(30) Foreign Application Priority Data

Jun. 13, 2014 (JP) ................................ 2014-122767

(51) Int. Cl.
*B60C 11/12* (2006.01)

(52) U.S. Cl.
CPC ...... *B60C 11/1218* (2013.01); *B60C 11/1236* (2013.01); *B60C 11/1259* (2013.01)

(58) Field of Classification Search
CPC ............. B60C 11/1218; B60C 11/1222; B60C 2011/1227
See application file for complete search history.

(56) References Cited

U.S. PATENT DOCUMENTS

| | | | | |
|---|---|---|---|---|
| 6,427,737 B1 * | 8/2002 | Katayama | ............... | B60C 11/11 152/209.21 |
| 7,416,004 B2 * | 8/2008 | Koya | ...................... | B60C 11/11 152/209.17 |
| 8,002,005 B2 * | 8/2011 | Sakamaki | ............... | B60C 11/12 152/209.22 |

(Continued)

FOREIGN PATENT DOCUMENTS

| | | |
|---|---|---|
| CN | 1860041 A | 11/2006 |
| CN | 101370674 A | 2/2009 |

(Continued)

OTHER PUBLICATIONS

Jul. 7, 2015 International Search Report issued in International Patent Application No. PCT/JP2015/002630.

(Continued)

*Primary Examiner* — Jodi C Franklin
(74) *Attorney, Agent, or Firm* — Oliff PLC

(57) ABSTRACT

The interval along the tire circumferential direction between sipes adjacent in the tire circumferential direction is 2 to 10 times the depth of the sipes. In the depth direction of the sipes, the sipes each have at least three sipe portions divided by at least two bent portions, and a bent portion angle formed between adjacent sipe portions with one of the bent portions therebetween is greater at the tread surface side than at the sipe bottom side.

6 Claims, 3 Drawing Sheets

(56) References Cited

U.S. PATENT DOCUMENTS

| | | | | | |
|---|---|---|---|---|---|
| 9,027,612 | B2* | 5/2015 | Yamakawa | .......... | B60C 11/0302 152/209.18 |
| 10,000,094 | B2* | 6/2018 | Saeki | .............. | B60C 11/11 |
| 2002/0017349 | A1* | 2/2002 | Lopez | .............. | B60C 11/12 152/209.18 |
| 2002/0166613 | A1* | 11/2002 | Radulescu | .......... | B60C 11/0309 152/209.2 |
| 2003/0192634 | A1* | 10/2003 | Hino | .............. | B60C 11/0306 152/209.18 |
| 2005/0150581 | A1* | 7/2005 | Kishida | .............. | B60C 11/12 152/209.18 |
| 2006/0086445 | A1* | 4/2006 | Kishida | .............. | B60C 11/0306 152/209.18 |
| 2006/0118221 | A1* | 6/2006 | Tsubono | .............. | B60C 11/12 152/209.18 |
| 2006/0137793 | A1* | 6/2006 | Nguyen | .............. | B60C 11/12 152/209.18 |
| 2006/0169377 | A1* | 8/2006 | Hashimoto | .............. | B60C 11/12 152/209.23 |
| 2010/0154952 | A1* | 6/2010 | Kageyama | .............. | B60C 11/12 152/209.18 |
| 2010/0154953 | A1* | 6/2010 | Kaji | .............. | B60C 11/12 152/209.21 |
| 2010/0212794 | A1* | 8/2010 | Watabe | .............. | B60C 11/11 152/209.18 |
| 2010/0218867 | A1* | 9/2010 | Matsumoto | .............. | B60C 11/12 152/209.18 |
| 2010/0224297 | A1* | 9/2010 | Kiwaki | .............. | B60C 11/11 152/209.23 |
| 2011/0048602 | A1* | 3/2011 | Hayashi | .............. | B60C 11/11 152/209.18 |
| 2012/0168049 | A1* | 7/2012 | Jenkins | .............. | B60C 11/12 152/209.21 |
| 2012/0180920 | A1* | 7/2012 | Nagayasu | .......... | B60C 11/1218 152/209.21 |
| 2012/0273104 | A1* | 11/2012 | Ishida | .............. | B60C 11/04 152/209.18 |
| 2013/0081744 | A1* | 4/2013 | Kameda | .............. | B60C 11/12 152/209.5 |
| 2014/0261936 | A1* | 9/2014 | Iwamura | .......... | B60C 11/1272 152/209.18 |
| 2014/0299245 | A1* | 10/2014 | Kaji | .......... | B60C 11/1218 152/209.25 |
| 2014/0305563 | A1* | 10/2014 | Kujime | .......... | B60C 11/1204 152/209.18 |
| 2015/0013865 | A1* | 1/2015 | Yoshikawa | .......... | B60C 11/1218 152/209.18 |
| 2015/0151586 | A1* | 6/2015 | Furusawa | .......... | B60C 11/1263 152/209.25 |
| 2015/0266346 | A1* | 9/2015 | Kaji | .......... | B60C 11/1218 152/209.18 |

FOREIGN PATENT DOCUMENTS

| | | | | |
|---|---|---|---|---|
| CN | 101511613 | A | 8/2009 | |
| CN | 100569546 | C | 12/2009 | |
| EP | 1 974 955 | A1 | 10/2008 | |
| EP | 2 058 145 | A1 | 5/2009 | |
| FR | 3012767 | A1 * | 5/2015 | ............ B60C 11/12 |
| JP | H04-306106 | A | 10/1992 | |
| JP | H07-41778 | B2 | 5/1995 | |
| JP | H11-123910 | A | 5/1999 | |
| JP | H11-151915 | A | 6/1999 | |
| JP | 2005-193867 | A | 7/2005 | |
| JP | 2007-137110 | A | 6/2007 | |
| JP | 2009-255734 | A | 11/2009 | |
| JP | 4589733 | B2 | 12/2010 | |
| JP | 2013-129325 | A | 7/2013 | |
| JP | 2013-189131 | A | 9/2013 | |
| JP | 2013-244812 | A | 12/2013 | |
| WO | 2007/083657 | A1 | 7/2007 | |
| WO | WO-2013136947 | A1 * | 9/2013 | ............ B60C 11/04 |

OTHER PUBLICATIONS

Jul. 3, 2018 Search Report issued in Chinese Patent Application No. 2015800306274.

* cited by examiner

PNEUMATIC TIRE

TECHNICAL FIELD

This disclosure relates to a pneumatic tire.

BACKGROUND

In a conventional pneumatic tire, a plurality of sipes extending in the tire width direction are formed in blocks (land portions) on the tread, and the sipes extend while bending in the depth direction thereof (see JP 2013-189131 A (PTL 1)).

In sipes that have such a bent portion, the block 's opposing wall surfaces that form the bent portion contact each other and interlock when the block deforms in the tire contact patch. This interlocking effect has been recognized to improve the rigidity of the block and the grounding property of the tire surface (tread surface).

One reason for improving the block rigidity and the grounding property of the tire surface is to improve the motion performance of the tire on snowy and icy roads, but numerous sipes could also be provided for the purpose of guaranteeing the biting and digging-up effect at the sipe edge. In order to suppress excessive block deformation as a result of the numerous sipes, a variety of shapes have been proposed for sipes.

The interlocking effect by the opposing wall surfaces of the block is also expected to contribute to improving the motion performance of the tire on road surfaces other than snowy and icy roads.

CITATION LIST

Patent Literature

PTL 1: JP 2013-189131 A

SUMMARY

Technical Problem

For example on wet road surfaces, it is known that sipes have a drainage effect in addition to improving the block rigidity and the grounding property of the tire surface. The state in which opposing wall surfaces of the block interlock with each other to improve the block rigidity and the grounding property of the tire surface, however, entails a loss of sipe volume. Therefore, the above-described improvement in rigidity and the grounding property are in a contradictory relationship with the drainage effect.

Therefore, in particular in a summer tire that is assumed to be used on wet road surfaces and dry road surfaces, it has been difficult to establish an appropriate sipe structure for making improvement in the block rigidity and the grounding property of the tire surface compatible with having a drainage effect.

Therefore, it would be helpful to provide a pneumatic tire that, while improving the block rigidity and the grounding property of the tread surface, also guarantees the drainage performance of the sipe and improves the wet performance.

Solution to Problem

To this end, our pneumatic tire comprises a plurality of sipes extending in a tire width direction on a tread surface; wherein an interval along a tire circumferential direction between the sipes adjacent in the tire circumferential direction is 2 to 10 times a depth of the sipes; and in a depth direction of the sipes, the sipes each have at least three sipe portions divided by at least two bent portions; and a bent portion angle formed between adjacent sipe portions with one of the bent portions therebetween is larger at a tread surface side than at a sipe bottom side.

In this disclosure, a "sipe" refers to a thin cut, from the tread surface inward in the tire radial direction, that has a width such that at least a portion of opposing wall surfaces contact each other (close) under a ground contact condition of the tire being mounted on an applicable rim and filled to prescribed internal pressure with a load corresponding to the maximum load capability.

Stating that the sipes "extend in the tire width direction" not only means sipes that extend along the tire width direction but also includes sipes that have a projection component in the tire width direction and that extend at an inclination relative to the tire width direction. In order to improve wet performance when driving straight, however, a range of 0° to 30° relative to the tire width direction is preferable, and extension in the tire width direction (0° is even more preferable.

Unless otherwise indicated, the "extending direction of the sipe" indicates a direction parallel to the direction along the sipe width centerline on the tread surface, and the "depth direction of the sipe" refers to a direction perpendicular to the tread surface.

The "tread surface" refers to the entire outer circumferential surface of the tire that comes into contact with the road surface when the tire is attached to an applicable rim, filled to a prescribed internal pressure, and rolled while being placed under a load corresponding to the maximum load capability.

The "applicable rim" is a standard rim in an applicable size prescribed by a valid industrial standard for the region in which the tire is produced or used, examples of which include the JATMA YEAR BOOK by the Japan Automobile Tyre Manufacturers Association (JATMA) in Japan, the STANDARDS MANUAL by the European Tyre and Rim Technical Organisation (ETRTO) in Europe, and the YEAR BOOK by The Tire and Rim Association, Inc. (TRA) in the United States of America (the applicable rim is called a Measuring Rim in the STANDARDS MANUAL by the ETRTO, and a Design Rim in the YEAR BOOK by the TRA).

The "prescribed internal pressure" represents the internal air pressure corresponding to the maximum load capability for each applicable size and ply rating prescribed by the aforementioned JATMA YEAR BOOK and the like. The "maximum load capability" represents the maximum mass which is permitted to be loaded on a tire, prescribed for the tire by the aforementioned standards.

Advantageous Effect

According to this disclosure, a pneumatic tire that, while improving the block rigidity and the grounding property of the tread surface, also guarantees the drainage performance of the sipe and improves the wet performance can be provided.

BRIEF DESCRIPTION OF THE DRAWINGS

In the accompanying drawings:

FIG. 5A is a partial cross-sectional drawing of the tread portion of Comparative Example 1, FIG. 5B is a partial cross-sectional drawing of the tread portion of Comparative Example 2, and FIG. 5C is a partial cross-sectional drawing of the tread portion of Comparative Example 3.

DETAILED DESCRIPTION

The following describes embodiments of this disclosure with reference to the drawings.

While omitted from the drawings, the pneumatic tire in the embodiments described below includes a tread portion, a pair of sidewall portions continuing from the tread portion outward in the tire width direction and extending inward in the tire radial direction, and a pair of bead portions respectively continuous with the inner side, in the tire radial direction, of the sidewall portions. Furthermore, each pneumatic tire includes a carcass, extending toroidally between the pair of bead portions, formed by one or more carcass plies that include radially arranged cords; a belt formed by one or more belt plies provided further outward in the tire radial direction than a crown portion of the carcass; tread rubber provided further outward in the tire radial direction than the belt; and a bead core buried in each bead portion. The outer surface of the tread rubber forms the tread surface. However, the aforementioned structure is not limiting.

In the embodiments described here, a plurality of sipes extending in the tire width direction are provided on the tread surface at approximately equal intervals in the tire circumferential direction around the entire tire circumferential direction, but apart from such sipes, sipes extending in the tire circumferential direction, one or more main grooves (circumferential grooves) extending in the tire circumferential direction, a plurality of auxiliary grooves extending in a direction intersecting the main grooves, a plurality of blocks (land portions) defined by the main grooves and the auxiliary grooves, and the like may be provided as appropriate on the tread surface. The tread pattern is not, however, limited to these examples.

This pneumatic tire is used as a tire for passenger vehicles, a tire for trucks and buses, and the like and in particular is envisioned as being widely used as a tire for passenger vehicles.

Embodiment 1

Figure 1:
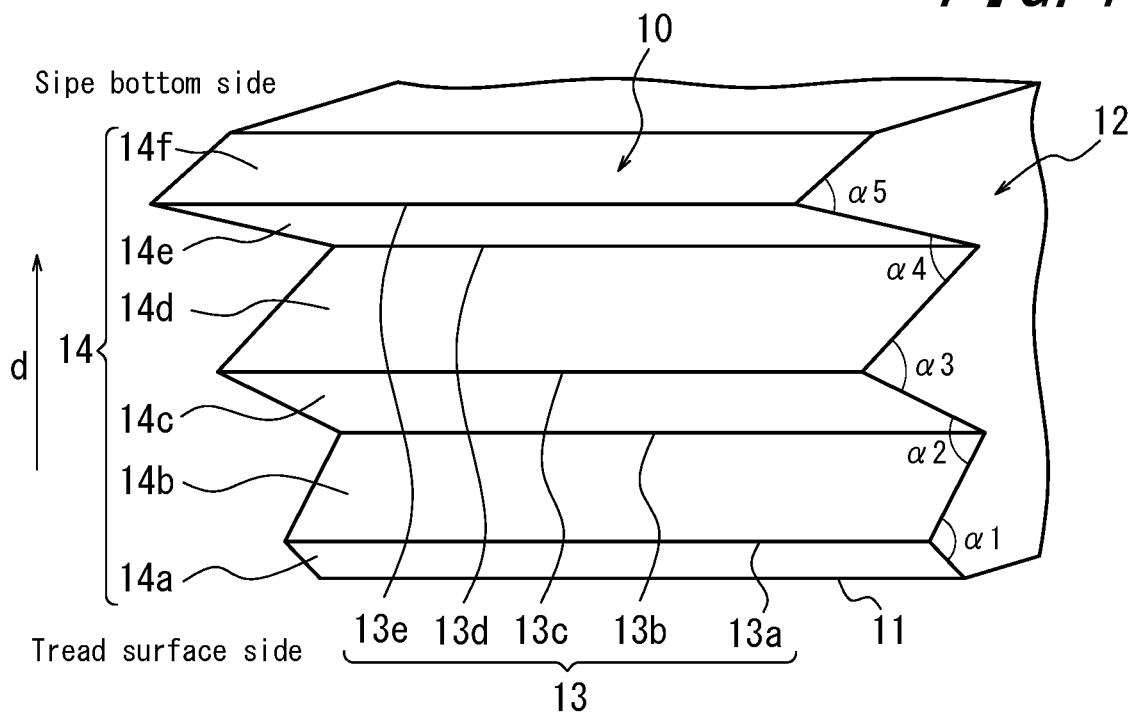
FIG. 1 is a partial cross-sectional drawing of the tread portion, schematically illustrating the structure in the depth direction of the sipes provided on the tread surface of a pneumatic tire according to Embodiment 1.

FIG. 1 is a partial cross-sectional drawing of the tread portion, schematically illustrating the structure in the depth direction of the sipes provided on the tread surface of a pneumatic tire according to Embodiment 1. The cross-sectional portion of FIG. 1 is a cross-sectional view perpendicular to the extending direction of the sipes on the tread surface, illustrating only one of the opposing wall surfaces of a sipe extending inward in the tire radial direction.

As illustrated in FIG. 1, a sipe 10 opens to a tread surface 11 and extends in the tire width direction and inward in the tire radial direction. The opening width of the sipe at the tread surface (when the tire is mounted on an applicable rim, filled to prescribed internal pressure, and is under no load) is preferably in a range of 0.2 mm to 0.5 mm. As one example, the opening width is formed to be 0.4 mm. The sipe depth, i.e. the distance in the tire radial direction from the tread surface 11 to the sipe bottom, is preferably in a range of 4 mm to 7 mm. As one example, the sipe depth is formed to be 5.5 mm.

The description of the structure and other features of this embodiment focuses only on one of the opposing wall surfaces forming the sipe 10, but the structure and other features of the other opposing wall surface are similar. A description of the other opposing wall surface having a corresponding structure and other features is omitted. The same is true for applicable drawings as well.

While not illustrated, in the example of the sipe 10 in this embodiment, tire width direction edges in the extending direction open to circumferential grooves, the sipe width is roughly constant as measured perpendicular to the direction in which the sipe extends on the tread surface and in the depth direction, and the pitch between sipes adjacent in the tire circumferential direction is formed to be relatively larger than usual.

The sipe 10 in this embodiment has, in the depth direction d of the sipe, six sipe portions $14a$ to $14f$ divided by five bent portions $13a$ to $13e$. In other words, the opposing wall surfaces forming the sipe 10 have five corners (bent portions $13a$ to $13e$) disposed continuously from the tread surface 11 in zigzag fashion inward in the tire radial direction, which is the depth direction d of the sipe, i.e. so that the direction of projection with respect to the tire circumferential direction alternates, and have six inclined surfaces (sipe portions $14a$ to $14f$) that form the corners and are disposed on both sides of each corner in the tire radial direction to be inclined towards each other.

In this embodiment, as an example, six sipe portions $14a$ to $14f$ divided by five bent portions $13a$ to $13e$ are illustrated, but this example is not limiting. In the depth direction of the sipe, the sipe 10 may have at least three sipe portions 14 that are divided by at least two bent portions 13.

The bent portion angle $\alpha$ ($\alpha1$ to $\alpha5$), which is the angle (the angle that does not exceed)180° formed between each adjacent pair among the six sipe portions $14a$ to $14f$ with one of the five bent portions $13a$ to $13e$ therebetween, is formed to be larger at the tread surface side ($\alpha1$) than at the sipe bottom side ($\alpha5$).

For example, the magnitude relationship between the bent portion angle $\alpha5$ that is at the sipe bottom side and is positioned furthest inward in the tire radial direction, the bent portion angle $\alpha3$ at approximately the central portion in the depth direction of the sipe, and the bent portion angle $\alpha1$ that is at the tread surface 11 side and is positioned furthest outward in the tire radial direction is $\alpha1>\alpha3>\alpha5$. Similarly, in this embodiment, the relationship $\alpha1>\alpha2>\ldots>\alpha5$ holds and is most preferable, but it suffices for at least the following to hold: $\alpha1>\alpha5$, and $\alpha n \geq \alpha(n+1)$ ($1 \leq n \leq 4$). In other words, there may be a portion where the bent portion angles of adjacent bent portions are the same.

The bent portion angle $\alpha$ is preferably set in a range of 80° to 160° and is more preferably set in a range of 100° to 120°. The reason is that contact between opposing sipe wall surfaces increases sufficiently, improving the block rigidity and the grounding property.

In order to balance the rigidity of the tread portion 12 forming the tread surface 11 with drainage, which corresponds to the sipe volume of the sipes 10, the sipes 10 disposed at approximately equal intervals in the tire circumferential direction are formed so that the separation distance (sipe interval) between sipes 10 adjacent in the tire circumferential direction is in a range of 2 to 10 times the sipe depth, preferably 4 to 6 times the sipe depth, and is 5 times the sipe depth as an example. In this embodiment, as an example, the sipe depth is approximately 5.5 mm, and the sipe interval is formed to be 20 mm to 30 mm.

When the sipe interval is less than two times the sipe depth, there is a risk of insufficient tread rigidity, whereas when the sipe interval exceeds 10 times the sipe depth, there is a risk of not being able to guarantee sufficient tread drainage. The lack of tread rigidity leads to a reduction in steering stability.

In the sipes 10 having the aforementioned structure, opposing sipe portions 14 approach and contact each other as a result of swelling deformation of the sipe portions 14 caused by the ground contact load produced at the time of ground contact by the tread surface 11. The sipe portions 14 in a zigzag shape in the depth direction d of the sipe thus engage, and an overlapping sipe interlock effect is produced.

The swelling deformation of the sipe portions 14 is largest at the central portion, in the depth direction d of the sipe, of the opposing wall surfaces of the sipe 10, which are the aggregate of the sipe portions 14. The swelling deformation decreases with greater distance from the central portion in the depth direction d of the sipe. As the bent portion angle α is smaller, the distance between opposing sipe portions 14, which is the distance between opposing wall surfaces of the sipe 10 measured in parallel to the tread surface 11, substantially increases, and the amount of contact between opposing sipe portions 14 reduces. The distance between opposing sipe portions 14 measured in parallel to the tread surface 11 changes depending on the bending angle of the bent portion 13 and grows shorter as the bending angle is greater.

Accordingly, in the sipes 10 according to this embodiment, the amount of swelling of the sipe portions 14 is reduced by increasing the bent portion angle α, which is the angle between sipe portions 14, from the sipe bottom to the tread surface 11 side, and the amount of sipe contact is increased near the tread surface 11, which is a location near ground contact with the road. As a result, the grounding property of the tread surface 11 that expresses tire gripping performance can be improved.

On the other hand, at the sipe bottom side, where the bent portion angle α is small as compared to the tread surface 11 side, the amount of sipe contact is small, and a gap is left between the opposing sipe portions 14. Hence, the drainage function of the sipe 10 can be guaranteed.

In this way, among the two or more bent portions 13 in the sipe 10, by setting the bent portion angle of the bent portion 13 on the tread surface 11 side to be relatively greater than the bent portion angle of the bent portion 13 on the sipe bottom side, the contact state with the road surface at the tread surface 11 side, i.e. the grounding property, is improved by the bent portion 13 on the tread surface 11 side, while the sipe volume at the sipe bottom side is increased by the bent portion 13 on the sipe bottom side, sufficiently guaranteeing a gap for drainage. Overall, therefore, wet performance can be improved.

In the sipe 10 having the aforementioned structure, the bent portion angle α of the sipe 10 is increased from the central portion in the depth direction d of the sipe towards the tread surface 11 side, thereby making it easier for opposing sipe portions 14 to contact at the tread surface 11 side, where the amount of swelling deformation of the sipe portions 14 is smaller, and further improving the grounding property (block grounding property) of the tread surface 11. Furthermore, by making the distance between opposing sipe portions 14 locally smaller at the tread surface 11 side, contact between sipe portions 14 can be achieved in the region where the swelling amount of the sipe portions 14 is smallest in the depth direction d of the sipe, thereby further improving the grounding property of the tread surface 11.

In this way, by facilitating contact between opposing sipe portions 14, the interlocking effect between sipe portions 14 can be improved. As a result, excessive deformation at the tread portion 12 where the sipes 10 are formed can be suppressed.

In this embodiment, in the sipe 10, the sipe portion 14a that is furthest on the tread surface 11 side among the at least three sipe portions 14 has a length, in the depth direction d of the sipe, that is 30% or less of the depth of the sipe 10. As a result, the sipe interlocking effect can be caused to occur from a position closer to the tread surface 11.

As illustrated in FIG. 1, in this embodiment, the sipe portion 14a that is furthest on the tread surface 11 side is inclined toward the depth direction of the sipe, but in terms of manufacturing (withdrawal of the sipe forming blade), the sipe portion 14a preferably extends in the depth direction of the sipe (in a direction perpendicular to the tread surface).

Embodiment 2

Figure 2:
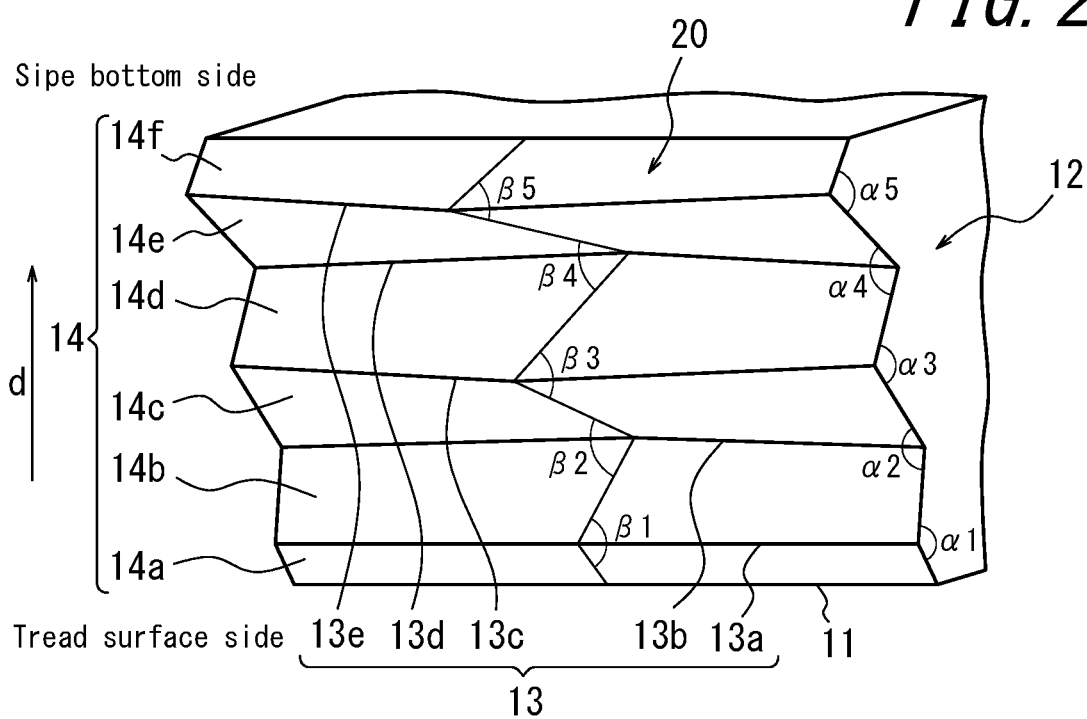
FIG. 2 is a partial cross-sectional drawing of the tread portion, schematically illustrating the structure in the depth direction of the sipes provided on the tread surface of a pneumatic tire according to Embodiment 2.

FIG. 2 is a partial cross-sectional drawing of the tread portion, schematically illustrating the structure in the depth direction of the sipes provided on the tread surface of a pneumatic tire according to Embodiment 2. The cross-sectional portion of FIG. 2 is a cross-sectional view perpendicular to the extending direction of the sipes on the tread surface, illustrating only one of the opposing wall surfaces of a sipe extending inward in the tire radial direction.

As illustrated in FIG. 2, in this embodiment, the bent portions 13 of a sipe 20 are formed continuously in the extending direction of the sipe, and the bent portion angle in each continuously formed bent portion 13 is larger at the edge than at the central portion in the extending direction of the sipe. The remaining structure is similar to that of the sipe 10 in Embodiment 1.

The bent portion angle of the bent portions 13 of the sipe 20 changes continuously in the sipe extending direction, and the bent portion angle α (α1 to α5) at the edges is larger than the bent portion angle β (β1 to β5) at the central portion in the sipe extending direction. That is, each bent portion 13 is formed as a mountain (or valley), with the central portion in the sipe extending direction as the apex (or bottom), and the sides of the apex (or bottom) being inclined towards the edges in the sipe extending direction.

By having the aforementioned structure, the edges in the sipe extending direction where the swelling amount of the sipe portions 14 is small can come into contact more easily, thereby further improving the grounding property of the tread surface 11. In other words, it is known that in general, the contact pressure of the sipe portions 14 (i.e., the opposing wall surfaces of the sipe 10) is greater at the central portion than at the edges in the sipe extending direction, whereas the edges in the sipe extending direction do not easily come into contact. Hence, making the bent portion angle α (α1 to α5) at the edges in the sipe extending direction large relative to the bent portion angle β (β1 to β5) at the approximate central portion in the sipe extending direction facilitates contact at the edges in the sipe extending direction, where contact is difficult, and further improves the grounding property of the tread surface 11.

The apex (or bottom) forming each bent portion 13 of the sipe 20 is preferably positioned in the central portion in the sipe extending direction. Here, the "central portion" in the sipe extending direction need not be exactly at the center and may be shifted towards the edge.

The apex (or bottom) of all of the bent portions 13 need not be positioned in the central portion in the sipe extending direction and may, for example, be positioned in the central portion in the sipe extending direction in only some of the bent portions 13.

Embodiment 3

Figure 3:
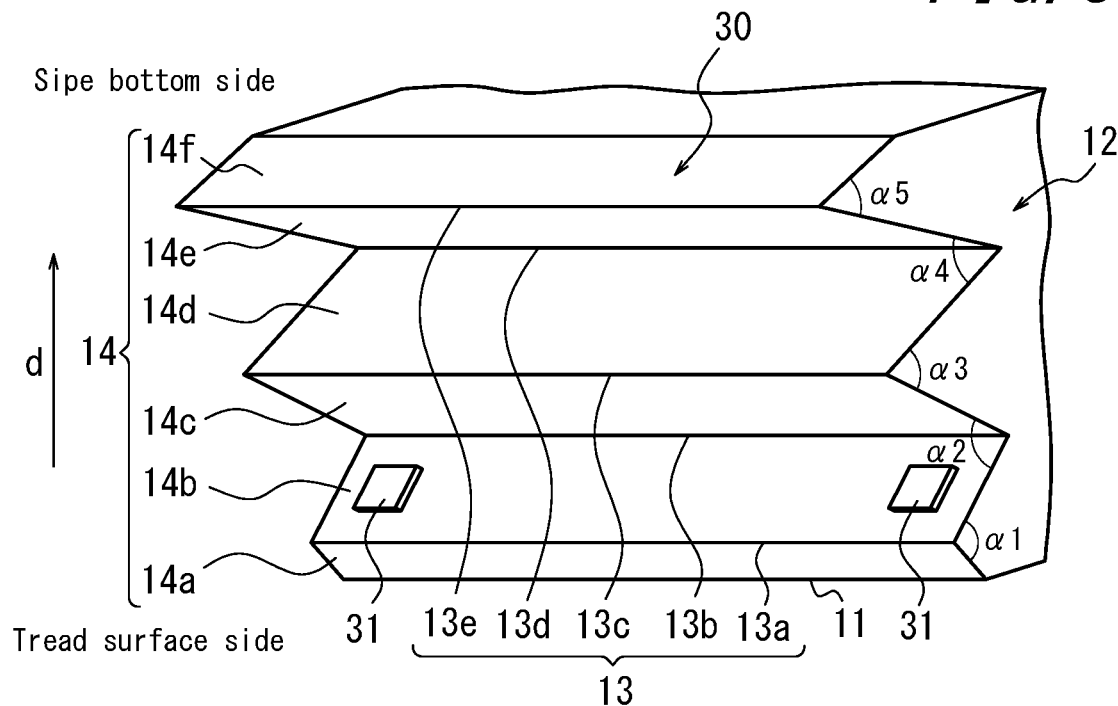
FIG. 3 is a partial cross-sectional drawing of the tread portion, schematically illustrating the structure in the depth direction of the sipes provided on the tread surface of a pneumatic tire according to Embodiment 3.

FIG. 3 is a partial cross-sectional drawing of the tread portion, schematically illustrating the structure in the depth direction of the sipes provided on the tread surface of a pneumatic tire according to Embodiment 3. The cross-sectional portion of FIG. 3 is a cross-sectional view perpendicular to the extending direction of the sipes on the tread surface, illustrating only one of the opposing wall surfaces of a sipe extending inward in the tire radial direction.

In this embodiment, as illustrated in FIG. 3, a sipe 30 includes a projection 31 projecting from the surface of the sipe portion 14 at both edges, in the sipe extending direction, of the sipe portion 14b that is close to the tread surface 11 among the sipe portions 14. In other words, as a result of the projections 31, the distance between opposing wall surfaces of the sipe 30 is smaller at the edges than at the central portion in the extending direction of the sipe 30. The projections 31 may be provided in the sipe portion 14 of either the sipe 10 of Embodiment 1 or the sipe 20 of Embodiment 2. The remaining structure is similar to that of the sipe 10 in Embodiment 1 or the sipe 20 in Embodiment 2. The "central portion" is the same as the central portion described above in Embodiment 2.

In other words, projections 31 are formed in the sipe 30 to make the distance between opposing wall surfaces of the sipe 30 (the distance between opposing sipe portions 14) narrower at the edges than at the central portion in the sipe extending direction. With these projections 31, the distance between opposing sipe portions 14 can be made shorter at the sipe portion 14 where the projections 31 are provided. Hence, even at a location where there is little swelling deformation and the opposing sipe portions 14 do not easily come into contact, the sipe portions 14 can more easily be caused to come into contact, i.e. interlock.

The projections 31 need to be placed at a location where the opposing sipe portions 14 do not contact each other easily. The inner edge of each projection 31 in the sipe extending direction is preferably placed in a range of ⅕ to ½ of the distance from the edge to the central portion of the sipe portion 14 in the sipe extending direction. As one example, the inner edge of each projection is placed at the ⅓ position from the edge in the sipe extending direction. The projections 31 are most preferably disposed in the sipe portion 14a that is closest to the tread surface 11 that grips the road surface but may be disposed in another sipe portion 14 (in this embodiment, the sipe portion 14b) as necessary.

Adopting the aforementioned structure increases the contact pressure that is intrinsically smaller at the edges than in the central portion in the sipe extending direction, thereby improving the grounding property of the tread surface 11 (block grounding property) and improving the wet performance.

It suffices for the projections 31 to be able to decrease the distance between opposing sipe portions 14 in the sipe portion 14 where the projections 31 are provided. The projections 31 are not limited to being rectangular (see FIG. 3), and any of a variety of shapes may be adopted, such as a circular plate shape, a cylindrical shape, a wide plate (bar), or the like. For example, when forming the projections 31 as wide plates (bars) that extend in the sipe extending direction, the projections 31 may be provided at the edges of the sipe portion 14 in the sipe extending direction, excluding the central portion. The projections 31 may be provided in a plurality of sipe portions 14 vertically in the depth direction of the sipe. In this case, the sipe portion 14 at the tread surface 11 side is extended to be longer in the sipe extending direction. The length in the sipe extending direction is adjusted in accordance with the swelling deformation state of the sipe portion 14.

When forming the sipe 30 in the tread portion 12 with a mold, a thin blade may be disposed in the portion that, after molding, will become the entire sipe portion 14 at the tread surface 11 side and the edges, in the sipe extending direction, excluding approximately ⅓ at the bottom side of the sipe depth, and the tire may then be subjected to vulcanization molding. As a result, the portion where the thin blade is positioned, i.e. the entire sipe portion 14 at the tread surface 11 side and the edges, in the sipe extending direction, excluding approximately ⅓ at the bottom side of the sipe depth can be formed with a narrower distance between opposing sipe portions 14 than at other portions (where the thin blade is not positioned). The sipe width can be adjusted freely by changing the blade thickness. As a result, the distance between opposing sipe portions 14 can be shortened without providing the projections 31.

EXAMPLES

In order to verify the effects of our pneumatic tire, we performed a sensory assessment test regarding the steering stability (wet steering stability) on a wet road surface. We produced three types (Examples 1, 2, and 3) of pneumatic tires on which to perform the test (test tires), respectively provided with the sipes 10 of Embodiment 1, the sipes 20 of Embodiment 2, and the sipes 30 of Embodiment 3. We then compared Examples 1 to 3 with pneumatic tires of Comparative Examples 1 to 3 regarding the wet steering stability. Examples 1 to 3 and Comparative Examples 1 to 3 all had a tire size of 225/45R17.

Figure 4:
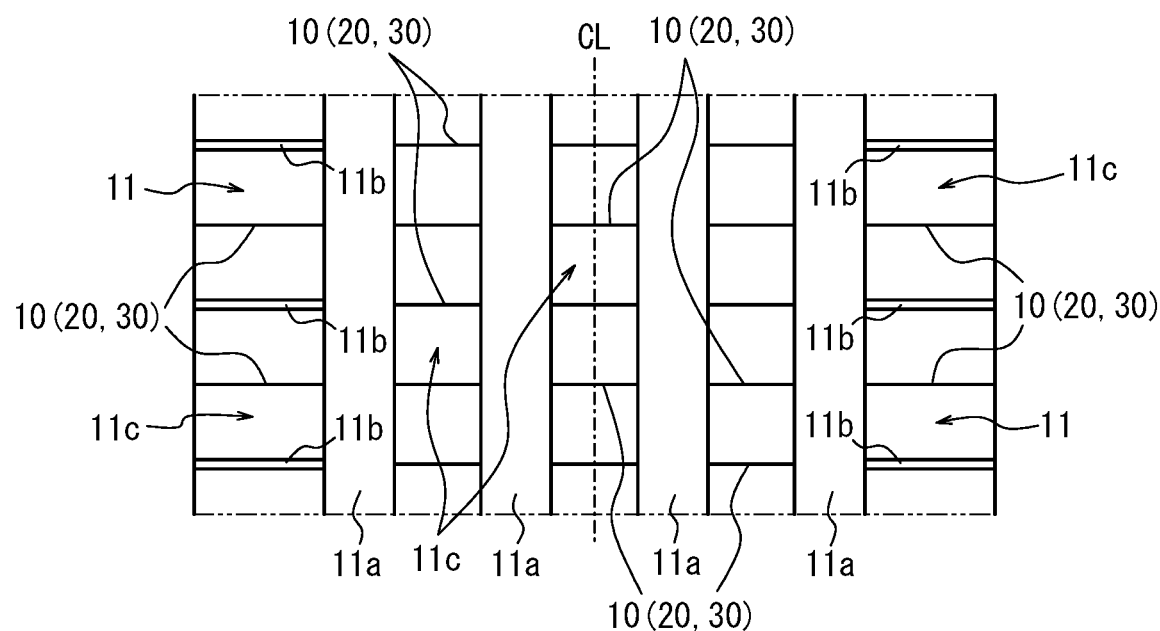
FIG. 4 illustrates a development of a portion on the tread surface of a test tire.

FIG. 4 illustrates a development of a portion on the tread surface of a test tire. As illustrated in FIG. 4, four main grooves (circumferential grooves) 11a extending in the tire circumferential direction, a plurality of widthwise lug grooves 11b extending in a direction intersecting the main grooves 11a in shoulder portions, a plurality of land portions 11c defined by the main grooves 11a and the widthwise lug grooves 11b, and sipes 10 (20, 30) formed in each land portion 11c are provided on the tread surface 11.

The widthwise lug grooves 11b are disposed to be separated by a distance of 45 mm each in the tire circumferential direction. The sipes 10 (20, 30) are disposed in each land portion 11c to be separated by a distance of 22.5 mm each in the tire circumferential direction, and the depth thereof is the same as that of the main groove 11a, namely 6 mm. The closest distance between opposing sipe portions 14 is 0.4 mm.

Figure 5A:
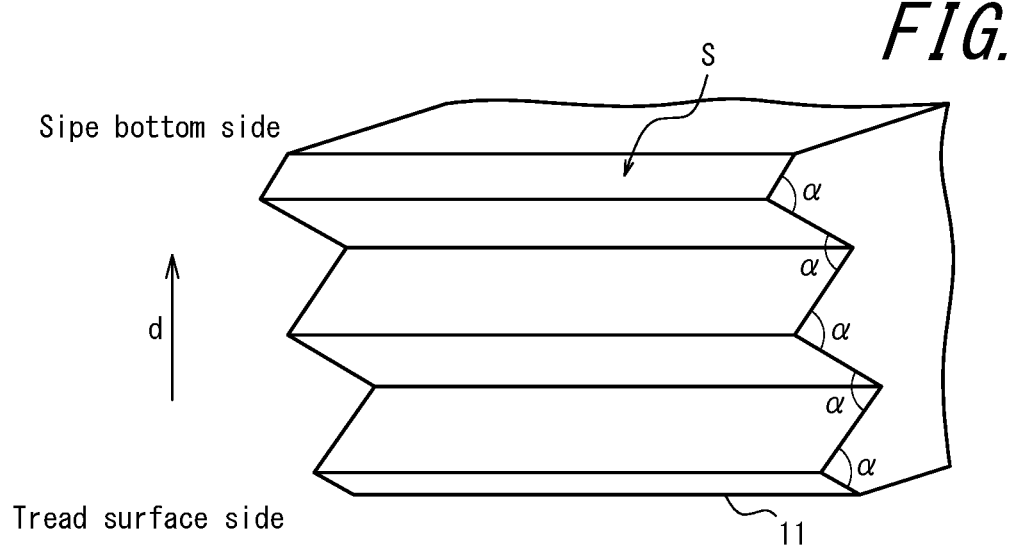
FIGS. 5A to 5C schematically illustrate the structure in the depth direction of the sipes provided on the tread surface of a test tire, where
Figure 5B:
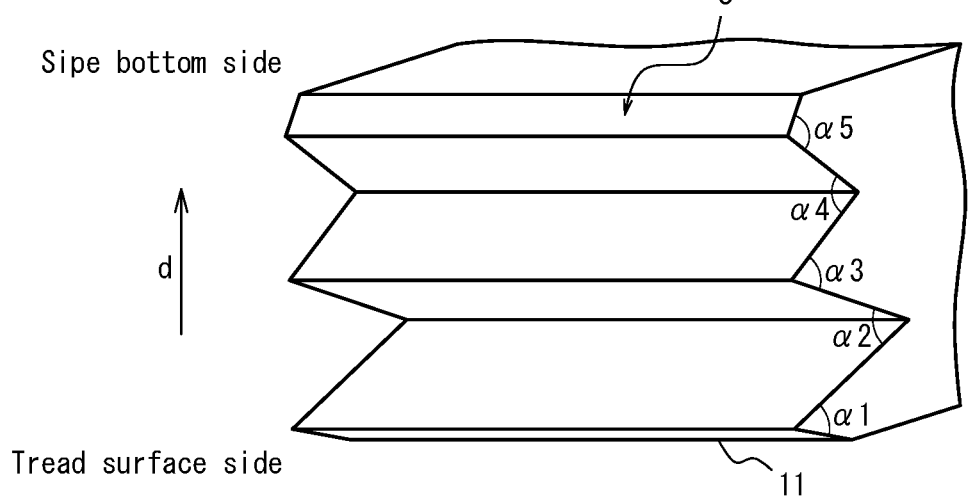
Figure 5C:
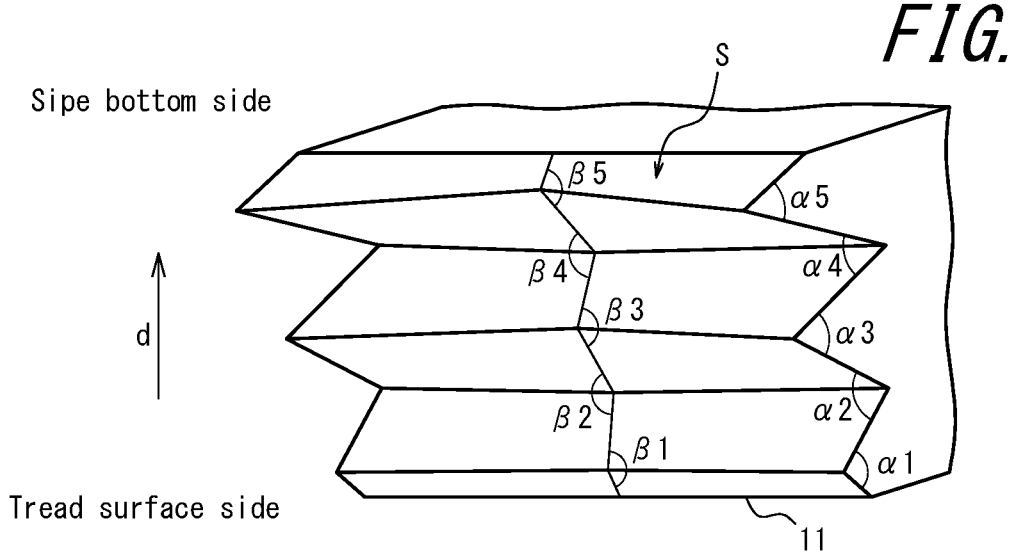

FIGS. 5A to 5C schematically illustrate the structure in the depth direction of the sipes provided on the tread surface of a test tire, where FIG. 5A is a partial cross-sectional drawing of the tread portion of Comparative Example 1, FIG. 5B is a partial cross-sectional drawing of the tread portion of Comparative Example 2, and FIG. 5C is a partial cross-sectional drawing of the tread portion of Comparative Example 3. The cross-sectional portion of FIGS. 5A to 5C is a cross-sectional view perpendicular to the extending direction of the sipes on the tread surface, illustrating only one of the opposing wall surfaces of a sipe extending inward in the tire radial direction.

The sipe shape of the test tires is as follows.

Comparative Example 1 (see FIG. 5A)

bent portion angles a of sipe S are all 100°

Example 1 (see FIG. 1)

the magnitude relationship between the bent portion angles is $\alpha 5$ at bottom side of sipe $10<\alpha 4<\alpha 3<\alpha 2<\alpha 1$ at tread surface side Comparative Example 2 (see FIG. 5B)

the magnitude relationship between the bent portion angles is $\alpha 5$ at bottom side of sipe $S>\alpha 4>\alpha 3>\alpha 2>\alpha 1$ at tread surface side (The magnitude relationship between the bent portion angles is reversed from Example 1)

Example 2 (see FIG. 2)

in addition to Example 1, the magnitude relationship between the bent portion angles is, in the extending direction of the sipe 20, central portion $\beta <$ edges $\alpha$ Comparative Example 3 (see FIG. 5C)

in addition to Example 1, the magnitude relationship between the bent portion angles is, in the extending direction of the sipe S, central portion $\beta >$ edges $\alpha$ (The magnitude relationship between the bent portion angles is reversed from Example 2)

Example 3 (see FIG. 3)

in addition to Example 2, the projections 31 are added to the sipe 30

The rates of change of the bent portion angles in Examples 1 to 3 and Comparative Examples 1 to 3, i.e. the depthwise angle rate of change representing the rate of change of the bent portion angle from the sipe bottom side to the tread surface side, the widthwise angle rate of change representing the rate of change of the bent portion angle from the central portion to the edges in the sipe extending direction, and the change in proximity between opposing sipe portions 14 at the edges in the sipe extending direction due to the projections 31 are as follows.

The depthwise angle rate of change is as follows. Comparative Example 1: 0 (all bent portion angles $\alpha$ are the same); Example 1: sipe bottom side 50%, tread surface side 150% as compared to Comparative Example 1; Comparative Example 2: sipe bottom side 150%, tread surface side 50% as compared to Comparative Example 1; Example 2: same as Example 1; Comparative Example 3: same as Example 1; Example 3: same as Example 2.

The widthwise angle rate of change is as follows. Comparative Example 1: 0% (no change in the sipe extending direction); Example 1: 0% (no change in the sipe extending direction); Comparative Example 2: 0% (no change in the sipe extending direction); Example 2: 50% at the center and 150% at the edges in the sipe extending direction as compared to Example 1; Comparative Example 3: 150% at the center and 50% at the edges in the sipe extending direction as compared to Example 1; Example 3: same as Example 2.

There is no change in proximity at the edges in the sipe extending direction in Comparative Example 1, Example 1, Comparative Example 2, Example 2, and Comparative Example 3 (no projections 31). There is a change of proximity only in Example 3 (provided with projections 31).

The following test conditions were adopted.

The test was performed by an actual vehicle evaluation on a test course, and the wet steering stability was rated by the driver's sensory assessment. A larger numerical rating indicates better performance. The driving test was performed on a wet handling road provided with a sprinkling environment, and the road surface temperature was 25°.

The results of a sensory assessment test performed regarding steering stability on a wet road surface under the aforementioned conditions are as follows. Table 1 lists part one of the sensory assessment test results, and Table 2 lists part two of the sensory assessment test results.

TABLE 1

|  | Comparative Example 1 | Example 1 | Comparative Example 2 |
|---|---|---|---|
| depthwise angle rate of change sipe bottom side/tread surface side | 0% | 50%/150% as compared to Comparative Example 1 | 150%/50% as compared to Comparative Example 1 |
| widthwise angle rate of change center/edges | 0% | 0% | 0% |
| change in proximity at edges | no change | no change | no change |
| wet steering stability | 4 | 6 | 3 |

TABLE 2

|  | Example 2 | Comparative Example 3 | Example 3 |
|---|---|---|---|
| depthwise angle rate of change sipe bottom side/tread surface side | same as Example 1 | same as Example 1 | same as Example 2 |
| widthwise angle rate of change center/edges | 50%/150% as compared to Example 1 | 150%/50% as compared to Example 1 | Example 2 |
| change in proximity at edges | no change | no change | change |
| wet steering stability | 8 | 4 | 9 |

First, as compared to Comparative Example 1, the score for the driver's sensory assessment of wet steering stability improved from 4 to 6 in Example 1. Conversely, a decrease in grip under a high input of force was noted for Comparative Example 2, which was processed to have the opposite magnitude relationship between the bent portion angles from Example 1.

The reason is thought to be as follows. When the bent portion angle was small, then the distance between opposing sipe portions substantially increased, the amount of contact between opposing sipe portions 14 decreased, and the interlocking effect was lost. Moreover, since the sipe formation region was close to the road surface where gripping force is achieved, degradation of the grounding property became more noticeable.

Next, as compared to Example 1, the score for the driver's sensory assessment of wet steering stability further improved from 6 to 8 in Example 2. Conversely, a decrease in grip under a high input of force was noted for Comparative Example 3, which was processed to have the opposite magnitude relationship between the bent portion angles from Example 2.

The reason is thought to be that the bent portion angles were set in a direction to reduce the amount of contact at the central portion in the sipe extending direction, where the swelling amount of the sipe portions 14 is large, and also at the edges in the sipe extending direction, where the swelling amount is small.

Finally, as compared to Example 2, the score for the driver's sensory assessment of wet steering stability further improved from 8 to 9 in Example 3. The reason is thought to be that by providing the projections 31, even though there was a concern that the drainage performance might degrade due to a reduction in sipe volume, such a degradation of drainage performance did not occur; on the contrary, because of the contact between opposing sipe portions near the tread surface 11 that contacts the road surface, the sipe interlocking effect was achieved, improving the grounding property of the tread surface 11.

REFERENCE SIGNS LIST 10, 20, 30, S Sipe
11 Tread surface
11a Main groove
11b Widthwise lug groove
11c Land portion
12 Tread portion
13, 13a to 13e Bent portion
14, 14a to 14f Sipe portion
31 Projection
d Depth direction of sipe
$\alpha$, $\alpha 1$ to $\alpha 5$, $\beta$, $\beta 1$ to $\beta 5$ Bent portion angle

The invention claimed is:

1. A pneumatic tire comprising a plurality of sipes extending in a tire width direction on a tread surface; wherein
    an interval along a tire circumferential direction between the sipes adjacent in the tire circumferential direction is 2 to 10 times a depth of the sipes; and
    in a depth direction of the sipes,
        the sipes each have at least three sipe portions divided by at least two bent portions; and
        a bent portion angle formed between adjacent sipe portions with one of the bent portions therebetween is larger at a tread surface side than at a sipe bottom side,
    wherein the bent portions are formed continuously in an extending direction of the sipes, and the bent portion angle in each continuously formed bent portion is larger at an end than at a center in the extending direction of the sipes.

2. The pneumatic tire of claim 1, wherein in each sipe, the sipe portion furthest on the tread surface side has a length, in the depth direction of the sipe, that is 30% or less of the depth of the sipe.

3. The pneumatic tire of claim 2, wherein a distance between opposing wall surfaces forming each of the sipes is narrower at the end than at the center in an extending direction of the sipes.

4. The pneumatic tire of claim 1, wherein a distance between opposing wall surfaces forming each of the sipes is narrower at the end than at the center in an extending direction of the sipes.

5. The pneumatic tire of claim 1, wherein a distance between opposing wall surfaces forming each of the sipes is narrower at the end than at the center in an extending direction of the sipes.

6. The pneumatic tire of claim 1, wherein in each sipe the bent portion angle is in a range of 100° to 200°.

* * * * *